Dec. 7, 1971 R. E. PITT 3,625,667
METHOD FOR COATING AND FORMING HIGH STRENGTH GLASS FIBER MAT
Filed June 18, 1969 2 Sheets-Sheet 1

INVENTOR.
RICHARD E. PITT
BY
Staelin + Overman
ATTORNEYS

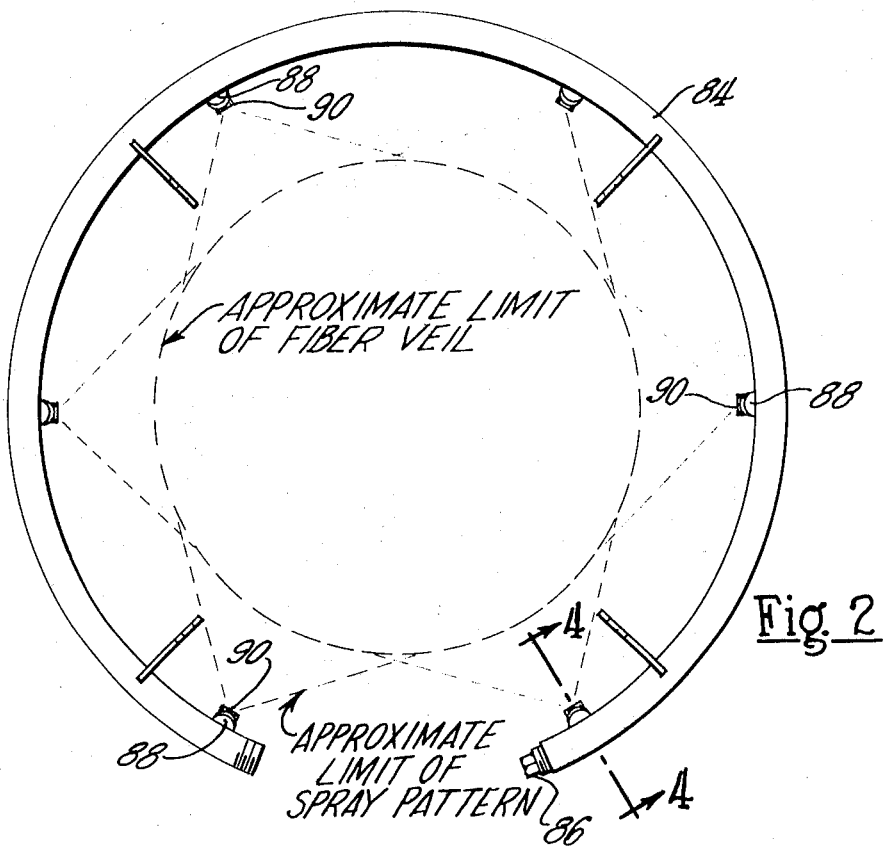
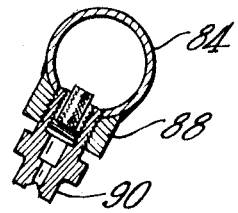
INVENTOR.
RICHARD E. PITT

United States Patent Office 3,625,667
Patented Dec. 7, 1971

3,625,667
METHOD FOR COATING AND FORMING HIGH STRENGTH GLASS FIBER MAT
Richard E. Pitt, Newark, Ohio, assignor to Owens-Corning Fiberglas Corporation
Filed June 18, 1969, Ser. No. 834,263
Int. Cl. C03c 25/02
U.S. Cl. 65—3
3 Claims

ABSTRACT OF THE DISCLOSURE

A more uniformly bonded glass fiber mat than produced by the prior art is obtained by causing droplets of binder having a predetermined and generally uniform size to penetrate a gas flow containing the attenuated glass fibers at an angle of convergence of less than approximately 40 degrees. The droplets are unaccompanied by gas flow other than that induced by the droplets. The size of the droplets are such that they are large enough to surround the juncture of abutting fibers but are sufficiently small that they will not penetrate the veil. These droplets are projected at a velocity generally equal to the velocity of the fibers of the veil.

BACKGROUND OF THE INVENTION

Randomly oriented glass fibers bonded together by organic binders are used in large quantities for insulation materials, for air filters, and for the reinforcing of organic plastic materials. Ever since the inception of the glass fiber mat producing industry, the fibers have been produced by the attenuation of streams of molten glass by a high velocity flow of steam or other hot gases. The resulting hot gases containing the fibers have been called a "veil" by the industry, and the binder for cementing the glass fibers together has, since the inception of the industry, been applied to the veil as an atomized spray of the binder solution. In substantially all cases, the binder solutions have been atomized by the action of high pressure air or other gases from nozzles that are located to the side of, and which project laterally into the veil. In two instances which applicant is aware, the subdividing of the binder solution into droplets has been affected by hydraulic pressure. In one of these instances, however, the stream of binder droplets was surrounded by an annular flow of high velocity gases intended to act as a shield. In the other instance, hydraulic pressure was used to produce a stream of droplets internally of an annular flow of mineral fibers. In both instances, however, the droplets were projected substantially horizontally into a downward flow of the fibers. In neither instance was the desired uniformity obtained.

An object of the present invention is the provision of a new and improved method and apparatus for producing bonded glass fibers in the form of a mat wherein a preponderance of the fibers are bonded to a single adjacent fiber at their cross over point by an amount of binder that is substantially no more than necessary to cement the fibers together.

Another object of the present invention is the provision of a new and improved method and apparatus which achieves the above object in a uniform manner without any substantial portion of the binder being cured without achieving the desired cementing of two fibers together at their cross over points.

A still further object of the invention is the provision of a new and improved method and apparatus which uniformly forces each fiber against an adjacent fiber to tack the two together at their cross over point without forcing large numbers of fibers together in a generally parallel arrangement.

Further objects and advantages of the invention will become apparent to those skilled in the art to which it relates from the following description of the preferred embodiments.

SUMMARY OF THE INVENTION

According to the invention, it has been discovered, that the flow of high velocity gases which has heretofore been used to force binder droplets into the veil, produces secondary swirls of the veil which align the fibers generally lengthwise of each other. Since the binder droplets accompany this flow of swirl producing gases, the aligned fibers are immediately wet with the aqueous binder solution which runs along the aligned fibers and thereafter holds the fibers in this aligned relationship even though they, thereafter, encounter swirling action of the veil. The art heretofore has labeled the aligned fibers which they have seen in the mat "ropes," but has not been fully aware of why, and how, the ropes have been produced, nor what could be done to prevent their formation.

According to the present invention, binder droplets must be caused to penetrate the veil without an accompanying flow of high velocity gases, except such gas flow as may be produced by the high velocity droplets themselves. In order to produce a mat where one fiber crosses only a single other fiber at a single point, the droplets, now devoid of fiber swirling gas flows, are caused to penetrate the veil with controlled kinetic energy. This kinetic energy is caused to be such as to impinge on a fiber and move it laterally by a distance corresponding to the normal separation of the fibers in the veil. By further causing the droplets to be of a size that is substantially no larger than is necessary to surround the two now abutting fibers, a subsequent build up of the abutting fibers is prevented. The fiber moving energy of the droplets is further controlled by causing the droplets to enter the veil with a velocity generally equal to that of the fibers in the veil, so that the droplets neither accelerate one fiber into a plurality of proceeding fibers, nor proceed so slowly that a plurality of subsequent fibers catch up with and build up upon the droplets. Because the droplets are many times larger in diameter than the fibers, the kinetic energy of a droplet is greater than that of a fiber and, therefore, the velocity of the droplets should never appreciably exceed that of the fibers. The gases, however, easily change course and flow around the droplets, and therefore, the velocity of the droplets can be somewhat less than that of the fibers. The high surface area of the fibers tends to cause the fibers to be able to change direction with the gas flow to a much greater degree than can the droplets. A controlled forcing together of the fibers is generally had by the controlled lateral movement of the droplets which is had by directing the droplets in the same direction as the veil but at an angle to converge therewith that is less than 40 degrees and preferably approximately 30 degrees or less, depending upon the size of the droplets. The size of the droplets ideally depends upon the percent of binder in the solution and must be such that it contains enough binder to, when the water is evaporated, leave sufficient binder to form a droplet slightly larger than two maximum fiber diameters. The droplet must also contain sufficient water to keep the hot gases from totally evaporating the water prior to the time that the droplet connects two fibers together, otherwise the droplet may be cured before flowing around the fibers.

BRIEF DESCRIPTION OF THE DRAWINGS

FIG. 2 is an enlarged view of the binder distribution header;

FIG. 3 is an end view of the hydraulic droplet producing nozzle;

FIG. 4 is a sectional view taken approximately on the line 4—4 of FIG. 2;

DESCRIPTION OF THE PREFERRED EMBODIMENTS

While the principles of the present invention can be applied to various glass fiber forming processes, they have particular advantages when embodied in the processes which utilize a centrifuge for the primary fiber production.

Figure 1:
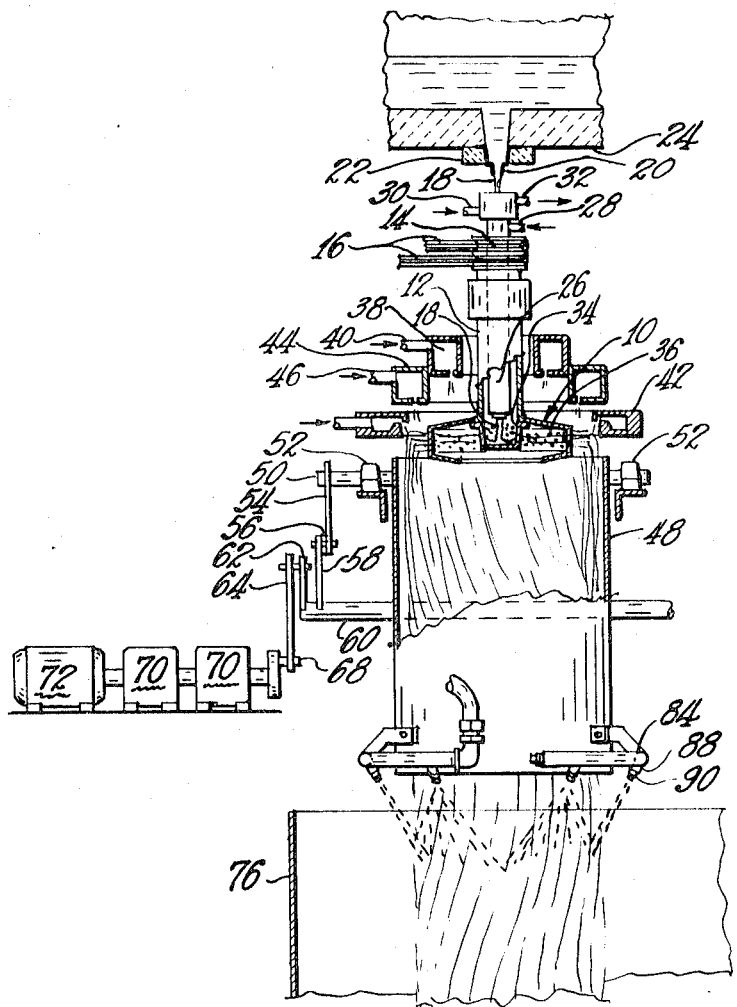
FIG. 1 is a side elevational view of one of a plurality of veil producing mechanisms which discharge onto a conveyor to form a mat, and which has portions broken away to better show these portions of structures.
Figure 1:
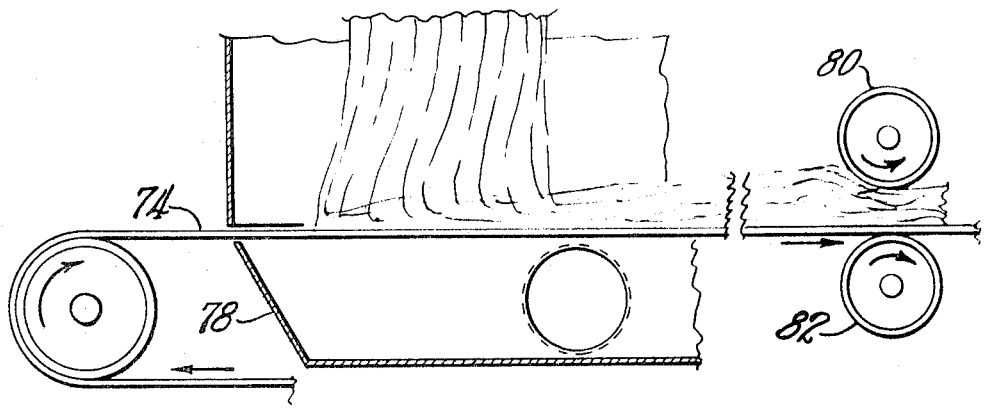

The embodiment shown in FIGS. 1-3 of the drawings generally comprises a centrifuge basket 10 that is affixed to the lower end of a tubular shaft or quill 12 the upper end of which is provided with a series of sheaves 14 which are driven by the belts 16 that in turn are driven by an electric motor, not shown. Molten glass is fed to the centrifuge in a small molten stream 18 which issues from an opening 20 in a bushing 22 in the bottom of a forehearth 24. The molten stream of glass 18 passes through a long tubular burner 26 which is supplied with gas by a gas conduit 28 for the purpose of keeping the molten stream fluid enough to pass through the centrifuge, and is used particularly at start up, and at low production rates. The tubular burner 26 is provided with a water jacket, not shown, but which is supplied with water from the supply conduit 30 and which exits through the outlet 32. The molten stream of glass 18 falls from the tubular burner 26 onto a cup 34 having foraminous sidewalls on the bottom of the basket from whence the molten glass is thrown to the periphery of the centrifuge basket where it passes through small openings to produce the primary fibers.

The primary fibers cool rapidly by radiation unless supplied with additional heat. An annular primary hot glass fiber attenuating burner 38 is positioned around and immediately above the periphery of the centrifuge basket to provide a downward flow of hot gases over the periphery of the basket. The burner is supplied with a combustible mixture of gases through the conduit 40, and hot gases exit therefrom at approximately sonic velocity to strike the primary fibers issuing from the basket and accelerate them downwardly in a fiber attenuating process. Secondary air is allowed to flow around and mix with the hot stream of fibers and gases in order to break the vacuum which the high velocity gases would create, to thereby reduce unwanted turbulence. This secondary air flow tends to cool the fibers to a solid state at a location a number of inches away from the basket, and at which point the gases from the primary burner have lost at least some of their effectiveness for accelerating the fibers. There is, therefore, in most instances provided an annular steam blower 42 at a location just beneath the centrifuge and positioned immediately outwardly of the flow of fibers. The steam blower has an annular jet which impinges downwardly upon the now solid fibers to accelerate the fibers and supply an additional pulling force thereto. This force is transmitted upwardly by the fibers to a point where the glass is sufficiently molten to attenuate. In some instances, the secondary air which enters through the space over the top of the steam blower ring 42 may cool the fibers at too rapid a rate, and in these instances, a secondary gas burner ring 44 may be provided to provide low pressure hot exiting gases which issue downwardly over the top of the steam blower ring 42 to heat the flow of secondary air. The secondary burner 44 is provided with a mixture of low pressure air and combustion gas through the conduit 46.

The mixture of hot gases, usually from 400° F. to 800° F. depending upon operating conditions, and fibers issue from the above described structure in what is known in the art as a "veil." This veil will usually be approximately 14 inches in diameter, whereas the mat that is desired to be produced may be from six to eight feet wide. In the embodiment shown in the drawing, the veil is caused to oscillate laterally by means of an oscillating deflector tube 48. The deflector tube 48 is supported by a shaft 50 which is mounted on trunnions 52 for oscillatory movement, and the shaft is in turn oscillated by a crank arm 54, connecting link 56, and crank arm 58 of a longitudinally extending drive shaft 60. The shaft 60 is in turn oscillated by a crank arm 62, connecting rod 64 and eccentric 68 that is rotatably driven by gear reducers 70 of the type described in the copending Langlois & Pitt application Ser. No. 694,325 filed Dec. 26, 1967 and assigned to the assignee of the present invention. The gear reducers 70 are in turn driven by an electric motor 72.

The prior art has heretofore used high pressure air to atomize an aqueous binder solution and has caused the resulting flow of binder droplets and air to impinge generally radially against the side edges of the veil to wet out the fibers with the binder solution prior to the time that they are collected upon the product conveyor 74. Usually a minimum of six and as many as twelve veils are caused to impinge upon the product conveyor 74 to provide the necessary build up of fibers, and the entire operation is surrounded by what is known as a forming hood 76 whose purpose is to confine the fibers to the conveyor, and act as a shield for preventing stray air currents from modifying the distribution of the fibers on the product conveyor. To aid in the collection process, a suction box 78 is positioned beneath the top flight of the conveyor 74 to pull all of the air within the forming hood downwardly through the product conveyor 74. The mat exiting from the forming hood 76 passes between squeeze rolls 80 and 82 positioned above and beneath the top flight run of the product conveyor 74.

The mats which have been produced by the prior art are nonuniform in that they contain a large number of balls of fibers called "wads" 'and strings of fibers called "ropes," which are not well integrated with the remaining fibers of the mat. According to principles of the present invention, it has been discovered that production of the "wads" and "ropes" is produced or greatly increased by the manner in which the prior art has applied binder to the veil. It has been found that high velocity jets of liquids and accompanying air flows, when directed generally radially against the veil, induce secondary swirls within the veil which produce the "balling" and "roping." Not only has the air flows produced secondary swirls within the veil, but the kinetic energy of the droplets, and to some extent of the gases has been applied to the fibers in such a way as to force large numbers of them into contact with each other, which then become wetted out by the binder to maintain the integrity of the ball or rope. According to the present invention, the binder is applied to the fibers of the veil by droplets of controlled size which are provided with a controlled component of lateral energy, just sufficient to force two fibers into engagement with each other to produce a single cross over point, by reason of the impact of the single droplet of binder. The droplets are sized large enough so as to provide sufficient binder to physically surround the two adjacent fiber diameters. Where the droplets which are used are an aqueous solution, they must also contain sufficient water to protect the binder from the hot gases, until such time as the mat leaves the forming hood and is in a stabilized form for cure in the curing oven. The gases in the veil are usually in excess of 400° F. and may be as much as 800° F., so that most of thet water in the droplets is quickly evaporated before or immediately after impingement of the droplets on the fibers, and prior to the time that the fibers are collected on the conveyor. It will be seen that excessively fine droplets will have their water completely evaporated, and their binder cured by the hot gases, without attaching a fiber to an adjacent fiber, and will therefore not accomplish their intended purpose.

According to the invention, an aqueous binder solution or aqueous binder dispersion is divided into droplets of a controlled size and these droplets are caused to converge onto the veil at an angle whose lateral component is just sufficient to force two fibers together when hit by a droplet. In the apparatus above described, it has been found that the droplets should have a velocity generally equal to that of the fibers in the veil, and should converge with these fibers at an angle less than 40 degrees, and preferably at approximately a 30 degree angle. It has further been found that these droplets should preferably not have a velocity more than approximately 10 percent greater than the fibers, but can have a velocity that is approximately two thirds that of the fibers. Analysis has shown that a high relative velocity droplet impacts with sequential fibers to produce a build up thereof; whereas a low relative velocity droplet produces less build up of the fibers, since the gases have less mass and flow around the droplets. The fibers, by reason of their high surface area, tend to travel with the gases rather than impinge upon the slow moving droplet.

The apparatus above described produces fibers which vary from 0.00005 inch diameter to a maximum diameter that is approximately 0.00060 inch. The binder solution which is usually used in the above process, comprises approximately 5 to 20 percent solids. Assuming the largest diameter fiber which is made by the process, and assuming that the binder must cover the adjacent fibers by a fiber diameter, the resin in the droplet must then amount to a theoretical droplet that is four fiber diameters. Assuming a slight space between the fibers, this resin diameter would be approximately 40 microns. By reason of the 5-1 dilution ratio of the binder solution, the solution droplet would have to be 90 microns without allowing for any wetting or running along of the fibers. Practically, therefore, the minimum droplet size necessary to bond two maximum size fibers together is approximately 100 microns. The maximum size particle which can be used will depend upon its energy relative to the ber distribution in the veil, and 250 microns has shown to be a practically upper limit in the apparatus above described. The preferred particle range is from approximately 150 microns to approximately 250 microns.

By way of example, the apparatus above described is operated to provide a gas flow to fiber ratio of approximately 10 pounds of gases to 1 pound of fibers, and which gas flow has a velocity at the exit of the deflector shield of 4,000 feet per minute and a temperature of 600° F. The binder solution used comprised 20% of a phenol-formaldehyde resite and 80% water. The resite was produced by charging a reactor with 80 parts of phenol, 123 parts of a 53% water solution of formaldehyde, 19.3 parts of water, and 12 parts of barium hydrate. The reactor was heated for a total of 7 hours, in which time it was stirred with a propeller type agitator. The charge was first heated to 110° F. and maintained at this temperature for approximately 2 hours, and was then heated and held at approximately 140° F. for the remaining 5 hours, at which time the refractive index of the reaction product was 1.4620, and the infrared absorption analysis indicated that it was substantially free of unreacted phenol and methylene groups. The reaction product was then cooled to approximately 100° F. and was neutralized with sulfuric acid to a pH of about 7.5. A 28 part charge of dicyandiamide was added to the neutralized reaction product, and the resulting mixture was heated to and maintained at approximately 140° F. for one hour. The reaction product was then cooled to approximately 75° F. and neutralized with further sulfuric acid to a pH of approximately 7.4. Eighty parts of this resin was then combined with 20 parts of pine wood pitch extract, 400 parts by weight of water, and 1 part of gamma aminopropyltriethoxysilane. The above equipment can be operated with as low as 6 pounds of gases per pound of fibers, and with as high as 15 pounds of gases per pound of fibers, and a temperature range of from 400° F. to 800° F.

In the above example, the binder solution was fed to one end of a generally circular binder header 84 that is affixed to the bottom of the deflector tube 48. The other end of the header 84 was closed by a removable plug 86, and the bottom of the header was provided with threaded outlets 88 located at 30 degrees to the vertical. The header was provided with a total of six threaded outlets 86, and a hydraulic nozzle 90 of the type shown in FIG. 3 was inserted in each. The binder solution was fed to the header at such pressure as to give a droplet size wherein 90% of the droplets were in the range of from 150 to 250 microns at which size they had an exit velocity of 4000 feet per minute. The fibers of the veil had a velocity of 5000 feet per minute and the mat which was produced had substantially no roping or balling, and had a mat strength, when cured, that was 20% greater then is produced by the same equipment except that the binder solution was sprayed onto the veil generally horizontal using an atomizing air flow.

The binder application header above described has the additional advantages in that it has but a small number of nozzles which drain the bottom of the header, and the supply to which enters one end of the header to avoid dead spots. The end removable plug 86 is adjacent the last nozzle and by removing the supply conduit and the end plug 86, the entire conduit can be easily cleaned. In addition, the header is of light weight, so that it can be supported directly on and moved along with the deflector shield 48 without providing sufficient inertia as to disrupt the corrective movement of the drive mechanism 70. The hydraulic nozzles 90 have an oblong discharge opening 92 and are installed with the major diameter positioned horizontally.

A photograph of the binder distribution pattern, showing its penetration of the veil has been taken. The photograph was taken at 1/100 of a second, and shows the droplets converging with the veil at an angle of approximately 30 degrees. It further shows that the droplets which issue from the nozzles at this angle penetrate uniformly to the center of the veil, where the droplets are joined by the droplets from the nozzle at the opposite side of the binder distribution ring.

While the invention has been described as having particular advantages in a centrifugal fiber forming apparatus employing a movable deflector shield, it is not so limited, and the principles of binder droplet application can be applied to other types of fiber forming apparatus as will occur to those skilled in the art. The velocity of glass fibers in a veil usually exceeds 4000 feet per minute, and is usually less than 10,000 feet per minute. In most instances, the fiber velocity will be less than 6000 feet per minute.

While the invention has been described in considerable detail, I do not wish to be limited to the particular mebodiments shown and described, and it is my intention to cover hereby all novel adaptations, modifications, and arrangements thereof which come within the practice of those skilled in the art to which the invention relates.

I claim:
1. In a process for producing bonded mats of mineral fibers of the type wherein mineral fibers having a diameter of the type wherein mineral fibers having a diameter of from 0.00005 inch to approximately 0.00060 inch are carried downwardly by a fiber carrying stream of high velocity gases to form a veil, the improvement comprising: projecting liquid droplets of a binder into the stream of gases and fibers at an angle to converge with the fibers at an angle no greater than approximately 40 degrees, the preponderance of said projected droplets being of a size sufficiently large to surround the juncture of two abutting crossing fibers but being sufficiently small that the droplets will not penetrate the veil, and said projected liquid droplets being unaccompanied by gas flow which produces swirling of the fibers in the fiber carrying stream of gases, and said droplets having a velocity generally equal to the velocity of the fibers of the veil to force the fibers together at cross over points without producing balls or strings of fibers.

2. The process of claim 1 wherein the projecting step is accomplished by hydraulic nozzles without air atomization and in which the kinetic energy of the droplets is obtained solely from a conversion of the pressure energy that is supplied to the nozzles.

3. The process of claim 1 wherein the droplets are projected into the fiber carrying stream at a velocity of between 0.66 and 1.1 times the velocity of the fibers in said stream.

References Cited

UNITED STATES PATENTS

| | | | |
|---|---|---|---|
| 2,919,970 | 1/1960 | Russell. | |
| 2,931,422 | 4/1960 | Long | 65—3 |
| 3,134,145 | 5/1964 | Miller. | |
| 3,343,933 | 9/1967 | Mullan et al. | 65—3 |

S. LEON BASHORE, Primary Examiner

R. L. LINDSAY, Jr., Assistant Examiner

U.S. Cl. X.R.

117—126